United States Patent
Choquette et al.

(10) Patent No.: US 7,376,800 B1
(45) Date of Patent: May 20, 2008

(54) SPECULATIVE MULTIADDRESS ATOMICITY

(75) Inventors: Jack H. Choquette, Mountain View, CA (US); Gil Tene, San Carlos, CA (US); Kevin Normoyle, Santa Clara, CA (US)

(73) Assignee: Azul Systems, Inc., Mountain View, CA (US)

( * ) Notice: Subject to any disclaimer, the term of this patent is extended or adjusted under 35 U.S.C. 154(b) by 211 days.

(21) Appl. No.: 11/117,657

(22) Filed: Apr. 27, 2005

Related U.S. Application Data (60) Provisional application No. 60/610,028, filed on Sep. 14, 2004.

(51) Int. Cl.
*G06F 12/00* (2006.01)

(52) U.S. Cl. .................. 711/147; 711/130; 711/141; 711/144; 711/145; 711/148; 711/156

(58) Field of Classification Search ............. 711/130, 711/141, 144, 145, 147, 148, 156
See application file for complete search history.

(56) References Cited

U.S. PATENT DOCUMENTS

| | | | | |
|---|---|---|---|---|
| 6,748,496 | B1* | 6/2004 | Scarpino ................. | 711/137 |
| 6,862,664 | B2 | 3/2005 | Tremblay et al. | |
| 6,938,130 | B2 | 8/2005 | Jacobson et al. | |
| 2003/0014602 | A1* | 1/2003 | Shibayama et al. ........ | 711/156 |
| 2003/0079094 | A1 | 4/2003 | Rajwar et al. | |
| 2004/0162967 | A1 | 8/2004 | Tremblay et al. | |
| 2004/0162968 | A1 | 8/2004 | Tremblay et al. | |
| 2004/0163082 | A1 | 8/2004 | Tremblay et al. | |
| 2004/0187115 | A1 | 9/2004 | Tremblay et al. | |
| 2004/0187116 | A1 | 9/2004 | Tremblay et al. | |
| 2004/0187123 | A1 | 9/2004 | Tremblay et al. | |

OTHER PUBLICATIONS

Rajwar et al, Improving the Throughput of Synchronization by Insertion of Delays, (HPCA), Jan. 2000.
Hammond et al., Programming with Transactional Coherence and Consistency (TCC), 2004.
Hammond et al., Transactional Memory Coherence and Consistency, Stanford University.
Hammond et al., Transactional Memory Coherence and Consistency, "all transaction, all the time", Stanford University, Jun. 21, 2004.
Sean Lie, Hardware Support for Unbounded Transactional Memory, Massachusetts Institute of Technology, May 7, 2004.
Herlihy et al., Transactional Memory: Architectural Support for Lock-Free Data Structures, University of Massachusetts.

(Continued)

*Primary Examiner*—Stephen Elmore
(74) *Attorney, Agent, or Firm*—Van Pelt, Yi & James LLP (57) ABSTRACT

A technique for performing a plurality of operations in a shared memory system having a plurality of addresses is disclosed. The technique includes entering into a speculative mode, speculatively performing each of the plurality of operations on addresses in the shared memory system, marking addresses in the shared memory system that have been operated on speculatively as being in a speculative state, and exiting the speculative mode, wherein exiting the speculative mode includes marking the addresses in the shared memory system that have been operated on as being in a non-speculative state.

28 Claims, 7 Drawing Sheets

OTHER PUBLICATIONS

Rajwar et al., Speculative Lock Elision: Enabling Highly Concurrent Multithreaded Execution, University of Wisconsin-Madison, (MICRO), Dec. 2001.

Rajwar et al., Transactional Lock-Free Execution of Lock-Based Programs, University of Wisconsin-Madison, (ASPLOS), October.

Ravi Rajwar, Speculation-Based Techniques for Lock-Free Execution of Lock-Based Programs, University of Wisconsin-Madison, 2002.

Ananian et al., Unbounded Transactional Memory, Feb. 2005.

Hammond et al, Transactional Memory Coherence and Consistency, Stanford University, 2004.

Jose F. Martinez and Josep Torrellas, Speculative Locks for Concurrent Execution of Critical Sections in Shared Memory Multiprocessors, Jose F. Martinez and Josep Torrellas, Workshop on Memory Performance Issues, Intl. Symposium on Computer Architecture, Jun. 2001 ("Speculative Locks 2001").

Jose F. Martinez and Josep Torrellas, Speculative Locks for Concurrent Execution of Critical Sections in Shared-Memory Multiprocessors, Jose F. Martinez and Josep Torrellas, Technical Report, UIUCCS-R-2001-2202, UILU-ENG-2001-1706, Department of Computer Science, University of Illinois, Feb. 2001 ("Speculative Locks Tech. Report 2001").

Jose F. Martinez and Josep Torrellas, Speculative Synchronization: Applying Thread-Level Speculation to Explicitly Parallel Applications, Advanced Symposium on Programming Languages and Operating Systems, Oct. 2002, San Jose, CA ("Speculative Synch. 2002").

Janice M. Stone, Harold S. Stone, Philip Heidelberger, and John Turek, Multiple Reservations and the Oklahoma Update, IEEE Parallel and Distributed Technology, 1993 ("Oklahoma Update 1993").

Steven S. Lumetta, Detection of Synchronization Errors through Speculative Lock Elision, Supplement of the International Conference on Dependable Systems and Networks, Bethesda, Maryland, Jun. 2002 ("Synchronization Errors 2002").

* cited by examiner

SPECULATIVE MULTIADDRESS ATOMICITY

CROSS REFERENCE TO OTHER APPLICATIONS

This application claims priority to U.S. Provisional Patent Application No. 60/610,028 entitled VIRTUAL MACHINE filed Sep. 14, 2004.

FIELD OF THE INVENTION

The present invention relates generally to computer memory. More specifically, speculative multiaddress atomicity (SMA) is disclosed.

BACKGROUND OF THE INVENTION

A shared memory system includes a plurality of addresses that are accessed by multiple agents. For example, a shared memory system could include an L1/L2 cache and a common memory store. In software, there are many instances in which two or more threads share a block of data. There are times where a thread must do a set of operations on one or more addresses without interference from another thread (e.g. read a value, increment it, store a new value). Typically, software will use locks to protect a set of addresses from being accessed by other threads while one thread is accessing those addresses. This locking creates a serialization point for software. However, many times this locking is done at a much coarser grain or more strictly than is actually needed. It would be desirable to eliminate the need for software locks in such cases and improve the efficiency of the shared memory system.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
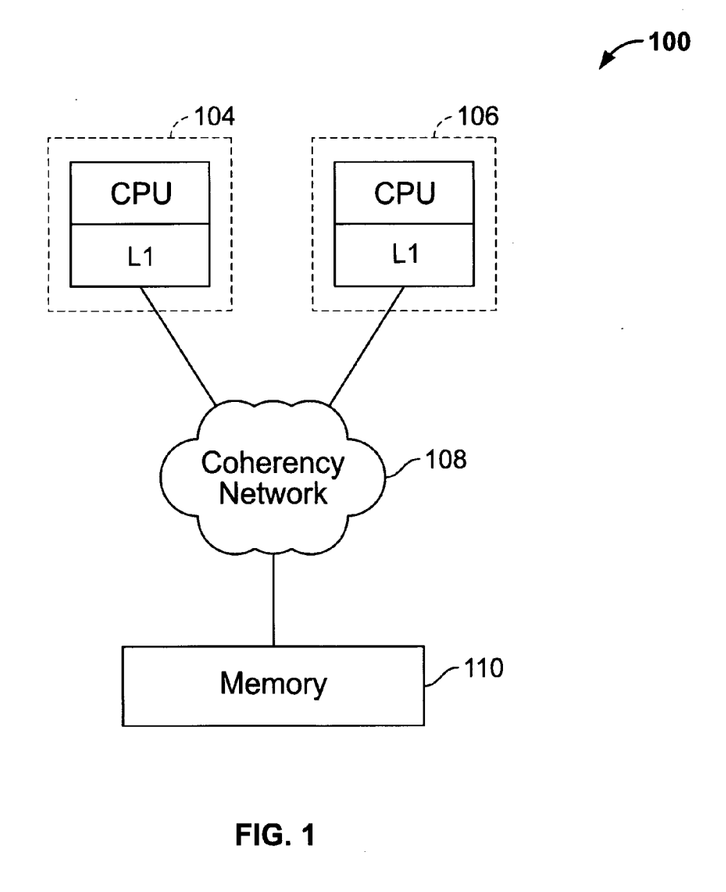
FIG. 1 is a block diagram illustrating a shared memory system.

FIG. 1 is a block diagram illustrating a shared memory system 100. In this example, shared memory system 100 is shown to include cache domain 104, cache domain 106, coherency network 108, and memory 110. Cache domain 104 is shown to include a CPU and an L1 cache. Cache domain 106 is shown to include a CPU and an L1 cache. Cache domains 104 and 106 and memory 110 communicate over coherency network 108. Cache domains 104 and 106 share memory 110. Every element connected to coherency network 108 is coherent.

There are numerous ways in which memory coherency can be maintained. In some embodiments, the shared memory system follows a cache coherency protocol that includes a modify, share, and/or invalid state, such as MSI or MESI. The coherency network may use snoops, directory-based, broadcast, or other protocols. Each cache domain could include multiple cache levels. For example, cache domain 104 could include an L1/L2 cache. Shared memory system 100 could include any number of processors, threads, and memory, and any number of cache domains. Memory 110 could be a global memory and system 100 could include any type of local memory.

In this example, a cache line in the modify state can return the invalid state in response to a coherency request. In addition, each cache has an ability to write back to memory or save data when a store is performed. The motivation for these attributes is more fully described below.

Figure 2:
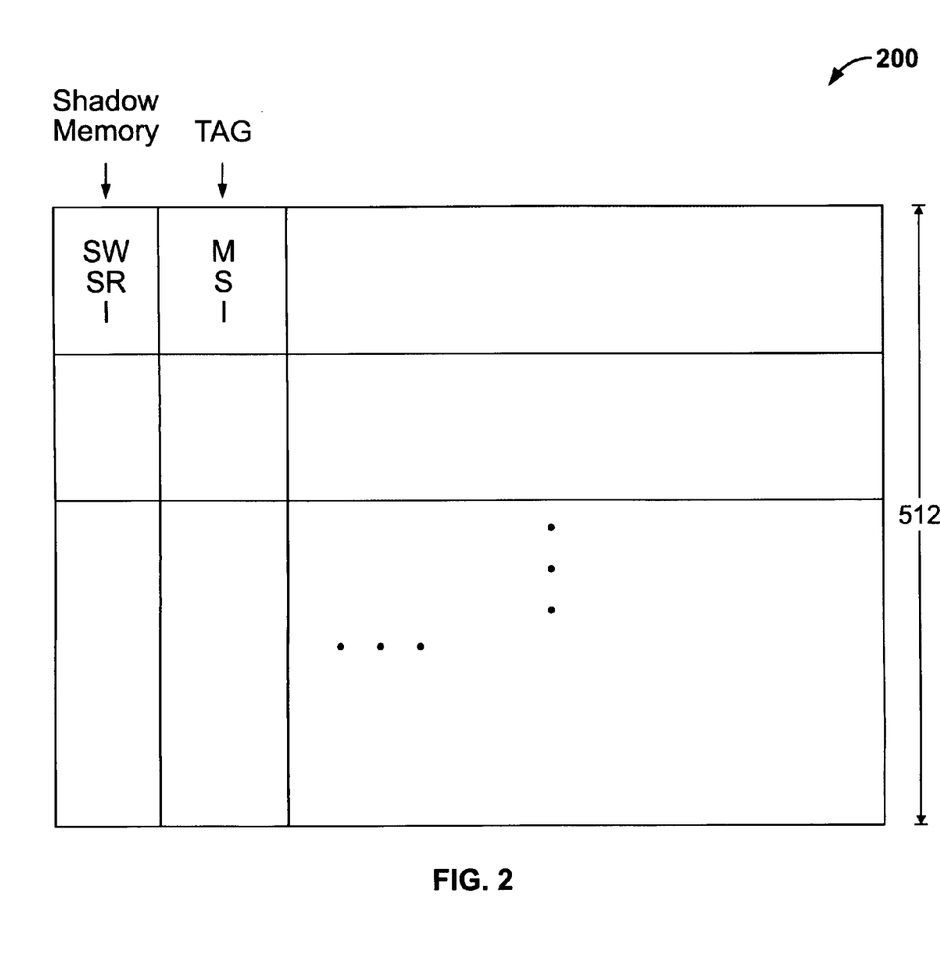
FIG. 2 is a block diagram illustrating a cache.

FIG. 2 is a block diagram illustrating a cache. In this example, cache 200 is shown to include 512 lines each having one of six states: invalid, share speculative read, share commit, modify speculative write, modify speculative read, and modify commit. In this example, each line is marked as being in a state using the shadow memory and tag value. The tag value indicates whether the line is in a modify, share, or invalid state. The tag value indicates an observable (or non-speculative) state. In some embodiments, in response to a coherency request, the tag value of that line is returned. The shadow value indicates whether the line is in a speculative write, speculative read, or invalid state. The shadow value indicates a speculative (or nonobservable) state. In some embodiments, a set of shadow values is stored in a register file so that multiple values can be read or modified in one cycle.

In some embodiments, there are two speculative bits in the shadow memory. In some embodiments, a three bit value is used to store the state. In this example, each line is shown to have a state. This example could also apply to an address where each address has a state. Although a line(s) may be described, any of the examples described herein could also apply to an address(es).

In some embodiments, a speculative state is applied to a plurality of caches.

Figure 3:
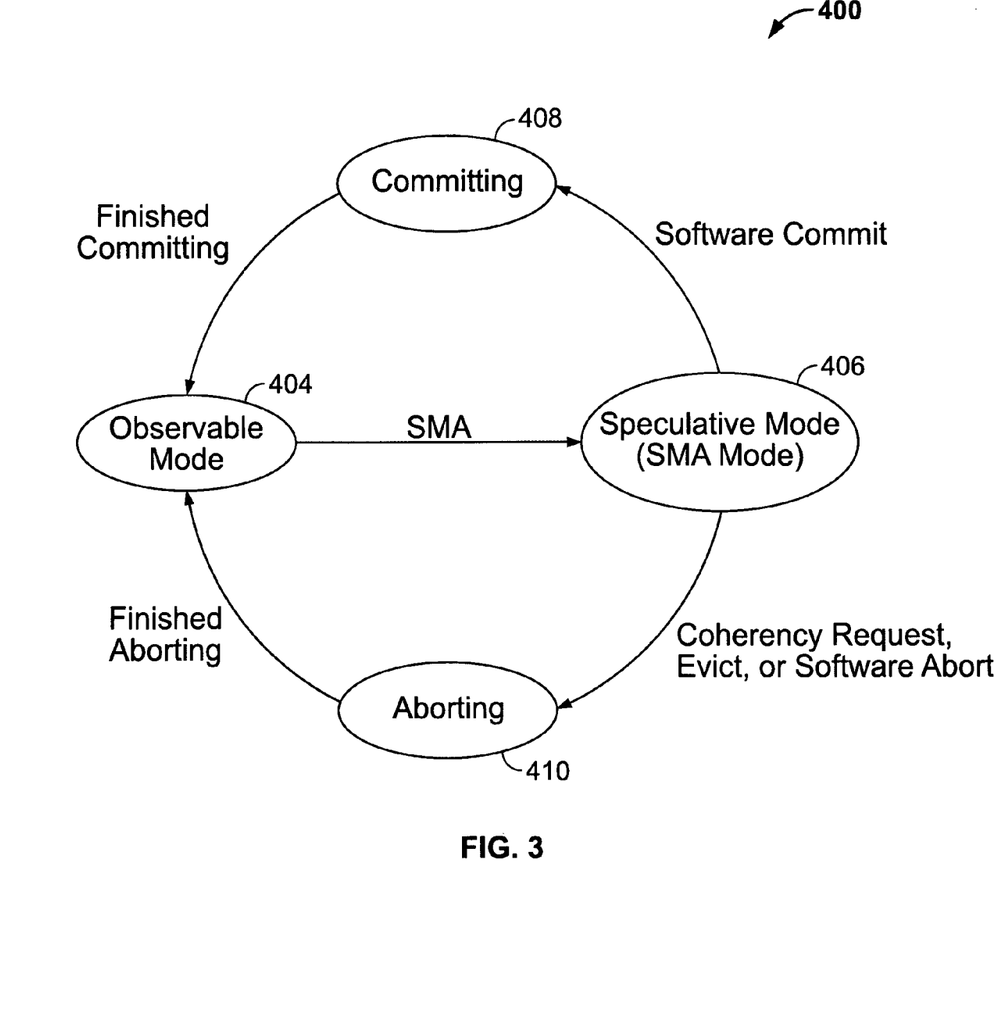
FIG. 3 is a state diagram illustrating various states of a cache.

FIG. 3 is a state diagram illustrating various states of a cache. For example, this state diagram could apply to the cache illustrated in FIG. 2. In this example, state diagram 400 is shown to include observable mode 404, speculative (or SMA) mode 406, committing state 408, and aborting state 410. In some embodiments, a set of software instructions are provided, which include "speculate", "commit", and "abort".

A cache in observable mode 404 transitions to speculative mode 406 when a "speculate" command is received. When in speculative mode 406, speculative operations may be performed on one or more lines or addresses in the cache. For example, an operation could include load (read) or store (write). Speculative operations are operations performed speculatively on the cache, but are not necessarily later committed. For example, during speculative mode, the cache may be disturbed, in which case the line may be invalidated, and the original value of the line retrieved from memory. In some embodiments, the operations performed on the cache when it is in speculative mode 406 form an atomic transaction. An atomic transaction satisfies all ordering and visibility constraints of the shared memory system. The cache transitions to committing state 408 when a "commit" command is received. When in committing state 408, speculative stores made to the cache are committed. When the committing process is complete, the cache returns to observable mode 404.

When the cache is in speculative mode 406, the cache enters aborting mode 410 when a speculative line in the cache is disturbed or an "abort" command is received. In some embodiments, a line is disturbed when a coherency request or eviction is received. For example, if another processor loads data to an address to which data was speculatively loaded or stored, a coherency request is made, and that address is disturbed. If another processor stores or loads data to an address to which data was speculatively stored, that address is disturbed. Also, if another processor stores data to an address to which data was speculatively loaded, that address is disturbed. An eviction could occur when a cache runs out of space. When in aborting state 410, speculative stores made to the cache are aborted. For example, lines or addresses to which data was speculatively stored may be invalidated. In some embodiments, the original data in those lines or addresses can be retrieved from memory. The original data is the last committed data in the line, prior to the speculative stores.

Figure 4A:
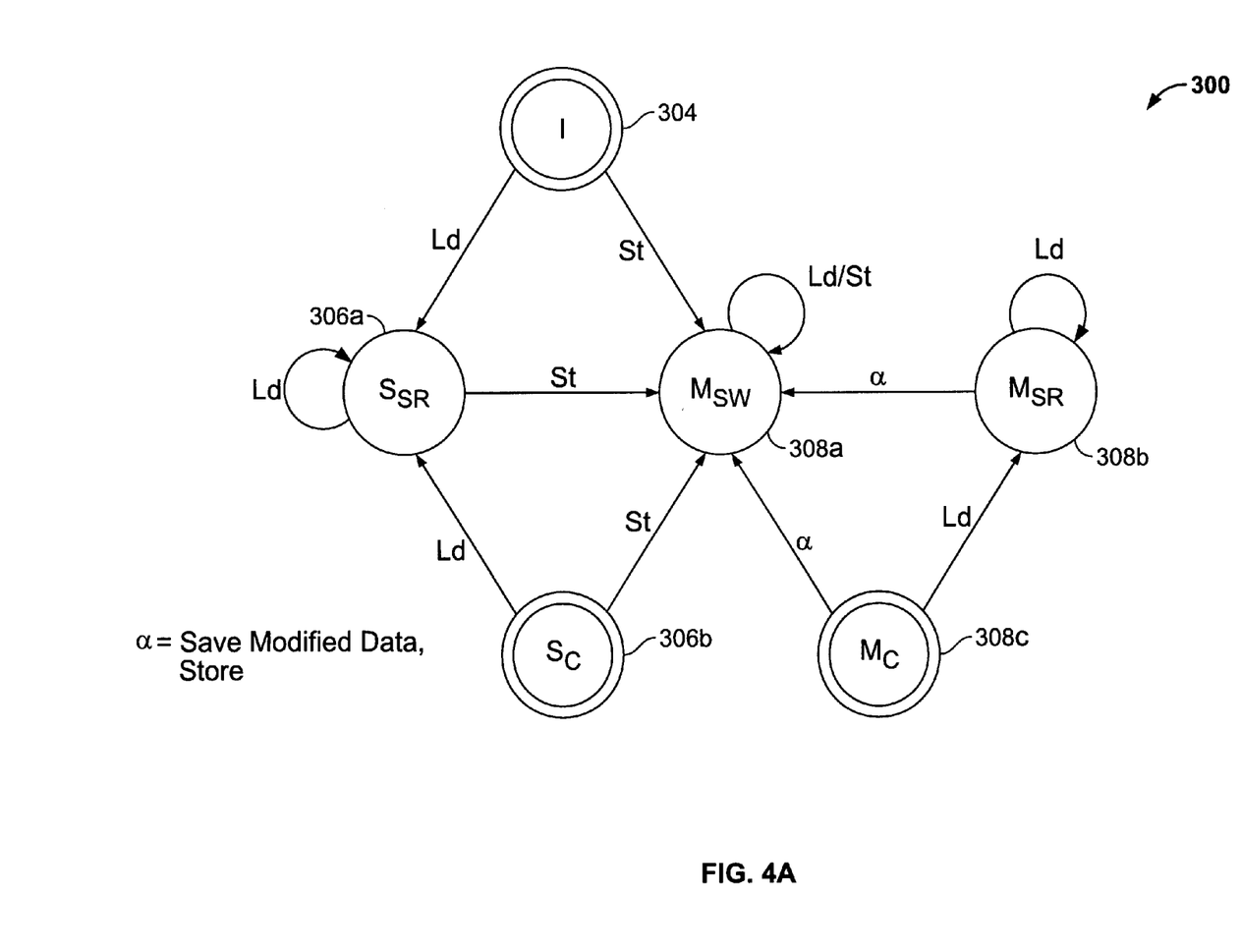
FIG. 4A is a state diagram illustrating various states of a line in a cache and the state transitions resulting from a load or a store under speculation.

FIG. 4A is a state diagram illustrating various states of a line in a cache and the state transitions resulting from a load or a store under speculation. For example, the state diagram may apply to a line (or address) in cache 200. In this example, state diagram 300 is shown to include three observable states and three speculative states. When the cache is in observable mode, each line is in an observable state. When the cache is in speculative mode, each line can be in a speculative state. The three observable states are indicated by a double circle, and include invalid state 304, share state 306b, and modify state 308c. The subscript "C" on states 306b and 308c indicates that the line has been committed, and thus is not in a speculative state.

In some embodiments, the software is aware of observable states, but not of nonobservable states (i.e., speculative states). In some embodiments, the speculative states are the states that occur during an atomic transaction, where the transaction includes a set of one or more operations that are speculatively performed.

The three speculative states include share state 306a, modify state 308a, and modify state 308b. The subscript "SR" on share state 306a indicates that the line is in a speculative read state. The subscript "SW" on state 308a indicates that the line is in a speculative write state. The subscript "SR" on state 308b indicates that the line is in a speculative read state. For example, referring to FIG. 2, a line in modify speculative write state 308a would have a tag value indicating that it is in a modify state and a shadow value indicating that it is in a speculative write state.

In this example, a standard MSI coherency state diagram is modified to include SMA speculative state transitions. Any cache coherency mechanism can be similarly modified in other embodiments. In this example, the state diagram transitions are described as follows:

A line in invalid state 304 transitions to share speculative read state 306a when a load is received for that line. When a store is received, the line transitions to modify speculative write state 308a.

A line in share speculative read state 306a remains in the same state when a load is received. When a store is received, the line transitions to modify speculative write state 308a.

A line in modify speculative write state 308a remains in the same state when a load or a store is received.

A line in share commit state 306b transitions to share speculative read state 306a when a load is received. When a store is received, the line transitions to modify speculative write state 308a.

A line in modify commit state 308c transitions to modify speculative read state 308b when a load is received. When a store is received, the line transitions to modify speculative write state 308a and the (original) modified data is saved, as more fully described below. In some embodiments, the modified data is written back to memory.

A line in modify speculative read state 308b remains in the same state when a load is received. When a store is received, the line transitions to modify speculative write state 308a and the (original) modified data is saved, as more fully described below. In some embodiments, the modified data is written back to memory.

The (original) modified data is saved when there may be a need to retain the modified data. For example, when a store is performed on a line in modify commit state 308c, the line transitions to modify speculative write state 308a. The modified data stored in the line is saved before the store is performed. In the event that an abort occurs, the line transitions to invalid state 304 and the modified data can be retrieved from memory. In some embodiments, the modified data is saved to a lower level of the cache hierarchy rather than memory. In some embodiments, the modified data is stored in a local shadow location.

In some embodiments, transitioning the state of the line includes marking the address (or line) in the cache as being in the new state.

Figure 4B:
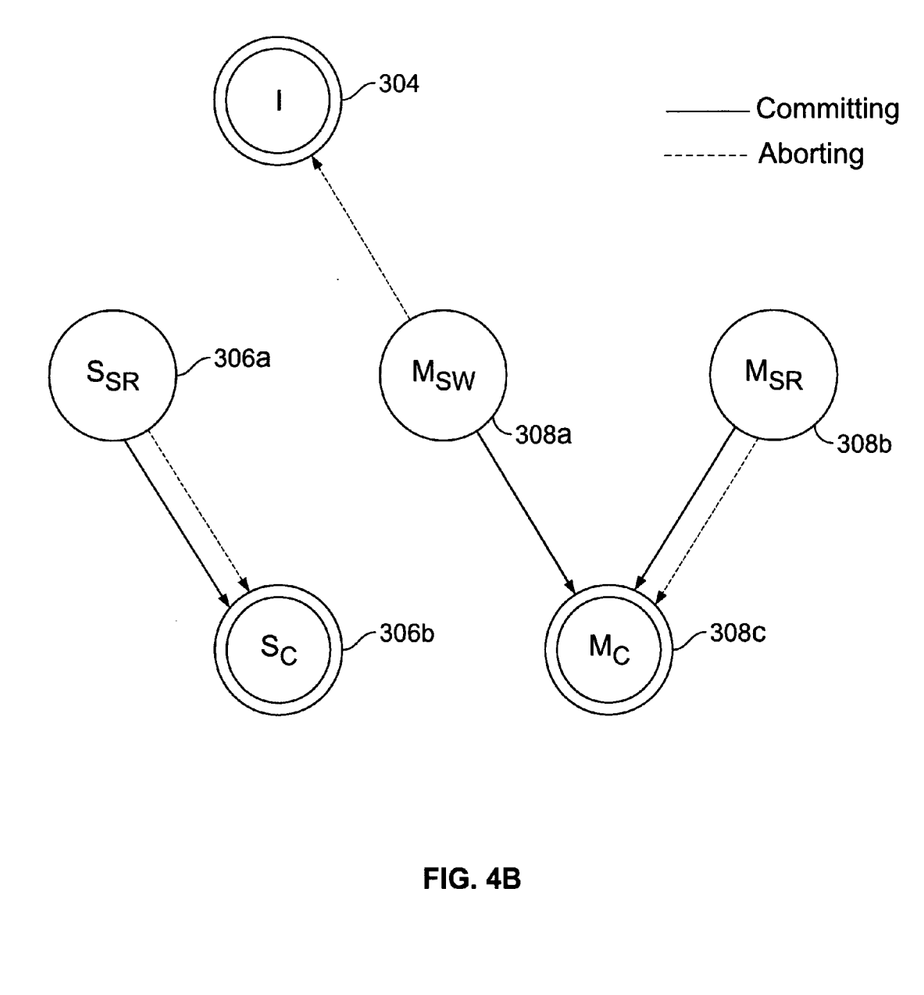
FIG. 4B is a state diagram illustrating various states of a line in a cache state transitions resulting from committing or aborting.

FIG. 4B is a state diagram illustrating various states of a line in a cache and the state transitions resulting from committing or aborting. For example, the state diagram may apply to a line (or address) in cache 200. In this example, the cache is in speculative mode and the line is in one of three speculative states: share speculative read state 306a, modify speculative write state 308a, or modify speculative read state 308b. When committing or aborting, the line transitions to one of three observable states: invalid state 304, share commit state 306b, or modify commit state 308c.

When committing, share speculative read state 306a transitions to share commit state 306b. Modify speculative write state 308a and modify speculative read state 308b transition to modify commit state 308c. When aborting, share speculative read state 306a transitions to share commit state 306b. Modify speculative write state 308a transitions to invalid state 304. Modify speculative read state 308b transitions to modify commit state 308c.

If the cache is in observable mode 404, each line is in one of observable states 304, 306b, and 308c and the state of each line can be observed. If the cache is in speculative mode 406, if a speculative line is disturbed, an abort occurs, and the cache returns to observable mode 404. If a non-speculative line is disturbed while in speculative mode, an abort will not necessarily occur. In some embodiments, a cache line can only be in a speculative state while in speculative mode. Each line in a speculative state returns to one of states 304, 306b, and 308c, depending on which speculative state 306a, 308a, and 308b, the line was in prior to the abort.

Figure 5A:
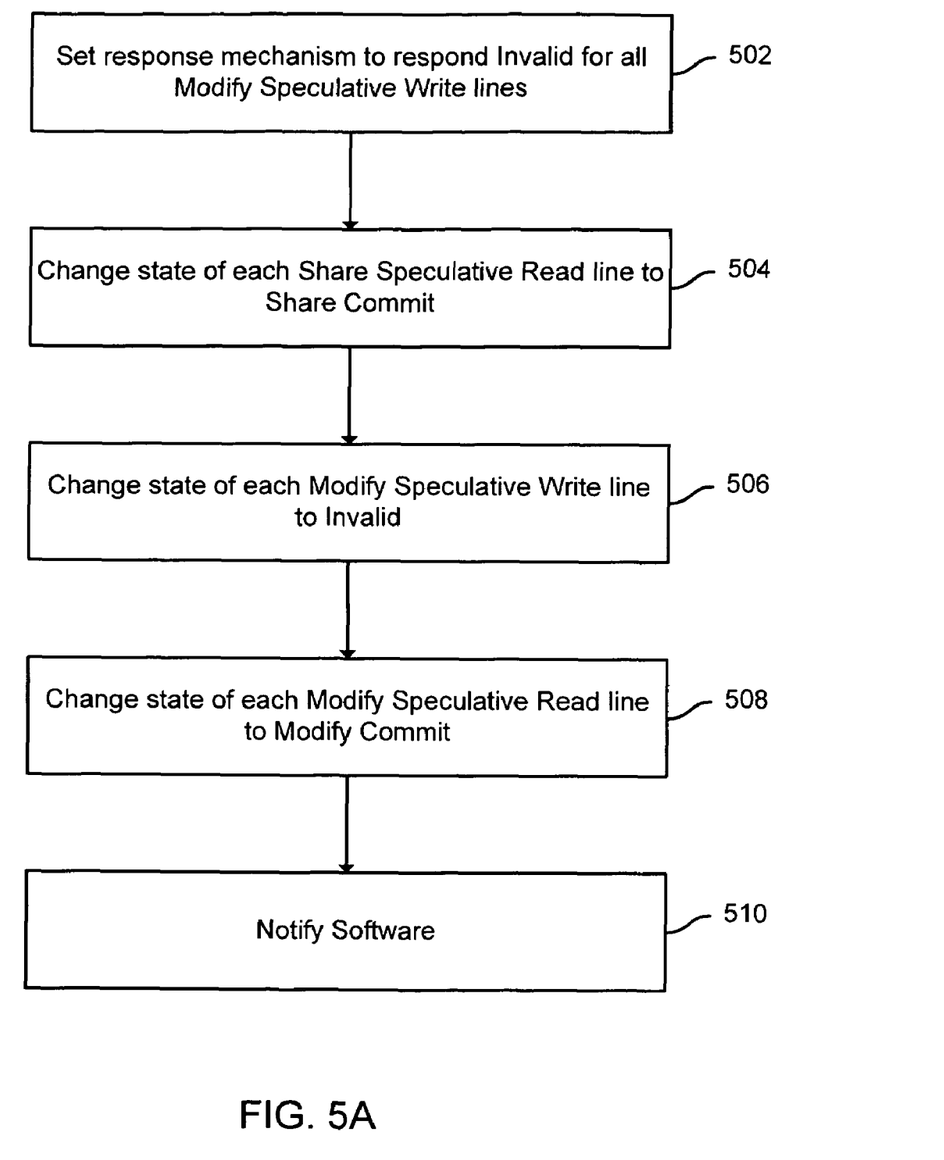
FIG. 5A is a flowchart illustrating an abort process.

FIG. 5A is a flowchart illustrating an abort process. In some embodiments, this process is performed on cache 200 when it is in aborting state 410. In this example, the state of each line in the cache is stored as shown in FIG. 2. When a coherency request is made of a line, the tag value of that line is returned.

In some embodiments, a response mechanism is set to respond "invalid" for all modify speculative write lines (502). As shown in FIG. 4B, a line that is in modify speculative write state 308a transitions to invalid state 304 when an abort occurs (during aborting state 410). In some embodiments, the abort process is atomic. The processor waits until the lines are transitioned (e.g., the tag values are changed) to invalid before responding to coherency requests. In some embodiments, rather than wait, a response mechanism is set to respond "invalid" for those lines (502).

The state of each share speculative read line is changed to share commit (504). The state of each modify speculative write line is changed to invalid (506). The state of each modify speculative read line is changed to modify commit (508). In (504) and (508), the tag value of the line does not change, so setting a response mechanism is not useful. The state transitions for (504)-(508) are shown in FIG. 4B. The software is notified (510) of the abort. For example, a trap, flag, interrupt, or exception could be generated. In some embodiments, the cache is now in observable mode 404.

In this example, when a coherency request is made of a line, the tag value of that line is returned. In other embodiments, the state of each line may be stored in other ways and other response mechanism(s) may be set.

There are various alternative ways to designate a set of observable and speculative states. For example, rather than designating state 308a as modify speculative write, state 308a could be designated as invalid speculative write. In this case, (502) could include setting the response mechanism to respond "modify" for all invalid speculative write lines.

Figure 5B:
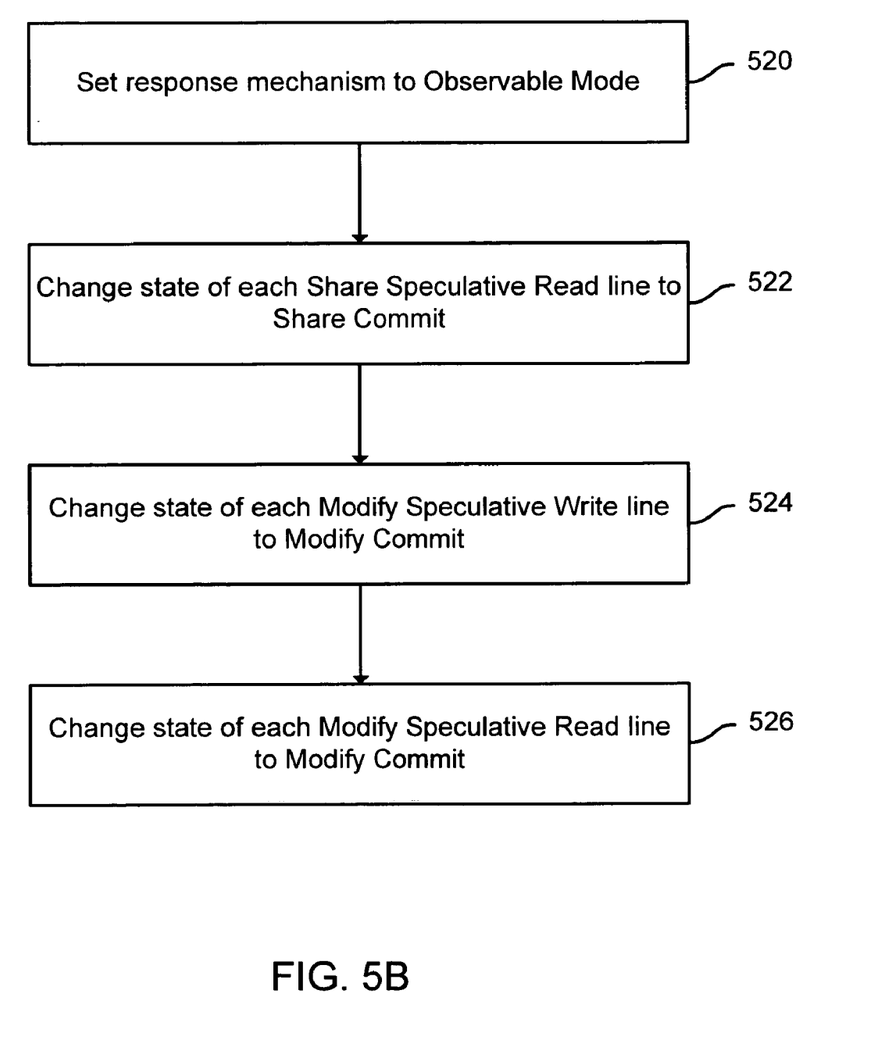
FIG. 5B is a flowchart illustrating a commit process.

FIG. 5B is a flowchart illustrating a commit process. In some embodiments, this process is performed on cache 200 when it is in committing state 408. In this example, the state of each line in the cache is stored as shown in FIG. 2. When a coherency request is made of a line, the tag value of that line is returned.

In this example, a response mechanism is set to observable mode (520). (520) is a non-operation, to contrast (502) in FIG. 5A, in which a response mechanism is set. The state of each share speculative read line is changed to share commit (522). The state of each modify speculative write line is changed to modify commit (524). The state of each modify speculative read line is changed to modify commit (526). The state transitions for (522)-(526) are shown in FIG. 4B. In some embodiments, the cache is not in observable mode 404.

In this example, when a coherency request is made of a line, the tag value of that line is returned. In other embodiments, the state of each line may be stored in other ways and one or more response mechanisms may be set. In some embodiments, the commit process is atomic.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing a plurality of operations in a shared memory system having a plurality of addresses comprising:
    entering into a speculative mode;
    speculatively performing each of the plurality of operations on addresses in the shared memory system such that the plurality of operations appears atomic to one or more execution threads;
    marking addresses in the shared memory system that have been operated on speculatively as being in a speculative state; and
    exiting the speculative mode, wherein exiting the speculative mode includes marking the addresses in the shared memory system that have been operated on as being in a non-speculative state.

2. A method as recited in claim 1, wherein the shared memory system includes a cache.

3. A method as recited in claim 1, wherein the shared memory system includes a global memory and a plurality of local memories.

4. A method as recited in claim 1, wherein the shared memory system includes a global memory and a plurality of caches.

5. A method as recited in claim 1, wherein the operations are performed atomically.

6. A method as recited in claim 1, wherein the operations are performed on a cache memory.

7. A method as recited in claim 1, further including detecting when a speculatively operated on address is disturbed.

8. A method as recited in claim 7, wherein an address is disturbed when a coherency request is made of that address.

9. A method as recited in claim 7, wherein an address is disturbed when an eviction is received.

10. A method as recited in claim 1, further including aborting the plurality of operations.

11. A method as recited in claim 10, wherein aborting includes setting a reporting mechanism to report an invalid state for addresses in a modified state that have been marked as having been speculatively written.

12. A method as recited in claim 1, further including committing the plurality of operations.

13. A method as recited in claim 1, wherein address states include modify, share, or invalid.

14. A method as recited in claim 1, further including marking the addresses as being in a non-speculative state.

15. A method as recited in claim 1, wherein one or more addresses reside in an L1 cache.

16. A method as recited in claim 1, wherein one or more addresses reside in an L2 cache.

17. A method as recited in claim 1, whereby another cache domain within the shared memory system is not affected.

18. A method as recited in claim 1, wherein an address is a cache line.

19. A method as recited in claim 1, wherein the speculative state is applied to a plurality of caches in the shared memory system.

20. A method as recited in claim 1, wherein the operations include a load or a store operation.

21. A method as recited in claim 1, further including saving original data when a store is performed.

22. A method as recited in claim 1, further including saving original data when the original data is in a non-speculative modified state.

23. A method as recited in claim 1, further including saving original data by storing the original data in a local shadow location.

24. A method as recited in claim 1, further including saving original data by storing the original data to lower level cache before performing a store.

25. A method as recited in claim 1, further including saving original data by storing the original data to memory before performing a store.

26. A method as recited in claim 1, further including retrieving original data from memory.

27. A system for performing a plurality of operations in a shared memory system having a plurality of addresses comprising:
a processor configured to:
enter into a speculative mode;
speculatively perform each of the plurality of operations on addresses in the shared memory system such that the plurality of operations appears atomic to one or more execution threads;
mark addresses in the shared memory system that have been operated on speculatively as being in a speculative state; and
exit the speculative mode, wherein exiting the speculative mode includes marking the addresses in the shared memory system that have been operated on as being in a non-speculative state; and
a memory coupled with the processor, wherein the memory provides the processor with instructions.

28. A computer program product for performing a plurality of operations in a shared memory system having a plurality of addresses, the computer program product being stored in a computer readable medium and comprising computer instructions for:
entering into a speculative mode;
speculatively performing each of the plurality of operations on addresses in the shared memory system such that the plurality of operations appears atomic to one or more execution threads;
marking addresses in the shared memory system that have been operated on speculatively as being in a speculative state; and
exiting the speculative mode, wherein exiting the speculative mode includes marking the addresses in the shared memory system that have been operated on as being in a non-speculative state.

* * * * *